United States Patent
Choi

(10) Patent No.: US 9,525,817 B2
(45) Date of Patent: Dec. 20, 2016

(54) SYSTEM AND METHOD OF CONTROLLING IMAGING DIRECTION AND ANGLE OF VIEW OF CAMERA

(71) Applicant: SAMSUNG ELECTRO-MECHANICS CO., LTD., Suwon-Si (KR)

(72) Inventor: Chul Choi, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 74 days.

(21) Appl. No.: 14/543,905

(22) Filed: Nov. 18, 2014

(65) Prior Publication Data

US 2015/0146028 A1  May 28, 2015

(30) Foreign Application Priority Data

Nov. 22, 2013  (KR) .......................... 10-2013-0143004
Sep. 24, 2014  (KR) .......................... 10-2014-0127923

(51) Int. Cl.
*H04N 5/222* (2006.01)
*H04N 5/232* (2006.01)
*H04N 5/247* (2006.01)

(52) U.S. Cl.
CPC ...... *H04N 5/23219* (2013.01); *H04N 5/23203* (2013.01); *H04N 5/247* (2013.01)

(58) Field of Classification Search
CPC . H04N 5/23219; H04N 5/23203; H04N 5/247
USPC ................................ 348/207.99, 333.03, 143
See application file for complete search history.

(56) References Cited

U.S. PATENT DOCUMENTS

| 5,485,239 A * | 1/1996 | Ohsawa ................. G02B 7/346 396/51 |
| 6,388,707 B1* | 5/2002 | Suda .................. H04N 5/23212 348/333.03 |
| 8,514,295 B2* | 8/2013 | Lee ........................ G06K 9/228 348/222.1 |

(Continued)

FOREIGN PATENT DOCUMENTS

| JP | 06-082682 A | 3/1994 |
| JP | 07-107360 A | 4/1995 |

(Continued)

OTHER PUBLICATIONS

Korean Office Action issued Aug. 6, 2015 in counterpart Korean Application No. 10-2014-0127923 (pp. 1-4 in English; pp. 5-8 in Korean).

*Primary Examiner* — Sinh Tran
*Assistant Examiner* — Zhenzhen Wu
(74) *Attorney, Agent, or Firm* — NSIP Law

(57) ABSTRACT

In a system and a method of controlling an imaging direction and an angle of view of a camera according to an aspect of the present disclosure, infrared light may be irradiated toward pupils of eyes of a user, and a position of infrared light reflected from the pupils of the eyes of the user may be detected by a first camera to track a line of sight of the user and calculate a viewing angle of the user. In addition, an imaging direction of a second camera may coincide with the line of sight of the user and an angle of view of the second camera may coincide with the viewing angle of the user to allow an image actually viewed by the user and an image captured by the camera to coincide with each other.

12 Claims, 10 Drawing Sheets

(56) References Cited

U.S. PATENT DOCUMENTS

| | | | |
|---|---|---|---|
| 2003/0223006 A1* | 12/2003 | Kito | G11B 27/11 |
| | | | 348/333.03 |
| 2013/0176474 A1 | 7/2013 | Kim | |
| 2014/0049667 A1* | 2/2014 | Robinson | H04N 5/23293 |
| | | | 348/262 |

FOREIGN PATENT DOCUMENTS

| | | |
|---|---|---|
| JP | 2000-293312 A | 10/2000 |
| JP | 2007-212664 A | 8/2007 |
| KR | 10-2007-0001414 A | 1/2007 |
| KR | 10-2012-0008191 A | 1/2012 |
| KR | 10-2012-0059304 A | 6/2012 |
| KR | 10-2013-0081439 A | 7/2013 |

\* cited by examiner

SYSTEM AND METHOD OF CONTROLLING IMAGING DIRECTION AND ANGLE OF VIEW OF CAMERA

CROSS-REFERENCE TO RELATED APPLICATION

This application claims the priority and benefit of Korean Patent Application Nos. 10-2013-0143004, filed on Nov. 22, 2013 and 10-2014-0127923 filed on Sep. 24, 2014, with the Korean Intellectual Property Office, the disclosures of which are incorporated herein by reference in their entireties.

BACKGROUND

The present disclosure relates to a system and a method of controlling an imaging direction and an angle of view of a camera.

As demand for a portable electronic apparatuses such as a smartphones and a tablet personal computers (PCs) has increased, camera modules have been increasingly provided in such portable electronic apparatuses.

Generally, an image capturing device such as a camera included in such a portable electronic apparatus includes an optical system capturing an image, a sensor unit, and an image processing device reconfiguring the image.

However, when a still image or video is captured using the image capturing device, an imaging direction and an angle of view of the image capturing device may not coincide with a line of sight and a viewing angle of eyes of a user, a difference between an image imaged by the image capturing device such as the camera and an image actually viewed by a person may be present.

Therefore, research into a technology of allowing an image actually viewed by a person and a captured image to coincide with each other to allow an object to be continuously viewed is required.

Patent Document 1 is provided as related art.

Related Art Document (Patent Document 1) KR 10-2012-0008191 A

SUMMARY

An aspect of the present disclosure may provide a system and a method of controlling an imaging direction and an angle of view of a camera capable of allowing an image actually viewed by eyes of a user and an image viewed through the camera to coincide with each other.

In a system and a method of controlling an imaging direction and an angle of view of a camera according to an aspect of the present disclosure, infrared light may be irradiated toward pupils of eyes of a user, and a position of infrared light reflected from the pupils of the eyes of the user may be detected by a first camera to track a line of sight of the user and calculate a viewing angle of the user.

In addition, an imaging direction of a second camera may coincide with the line of sight of the user and an angle of view of the second camera may coincide with the viewing angle of the user to allow an image actually viewed by the user and an image captured by the camera to coincide with each other.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
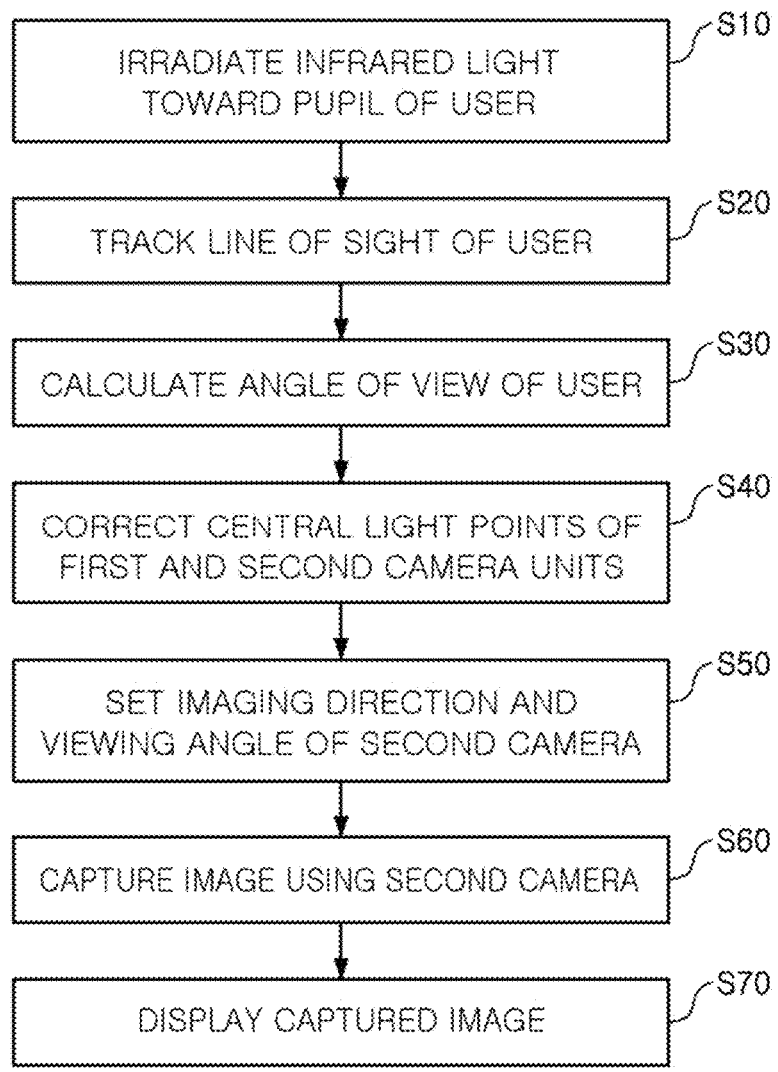
FIG. 1 is a flow chart illustrating a method of controlling an imaging direction and an angle of view of a main camera according to an exemplary embodiment of the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Terms with respect to directions will be first defined. A Z direction refers to a direction from a first camera toward a second camera or a direction opposite thereto, an X direction refers to a direction perpendicular to the Z direction, and a Y direction refers to a direction perpendicular to both of the Z direction and the X direction.

Figure 2:
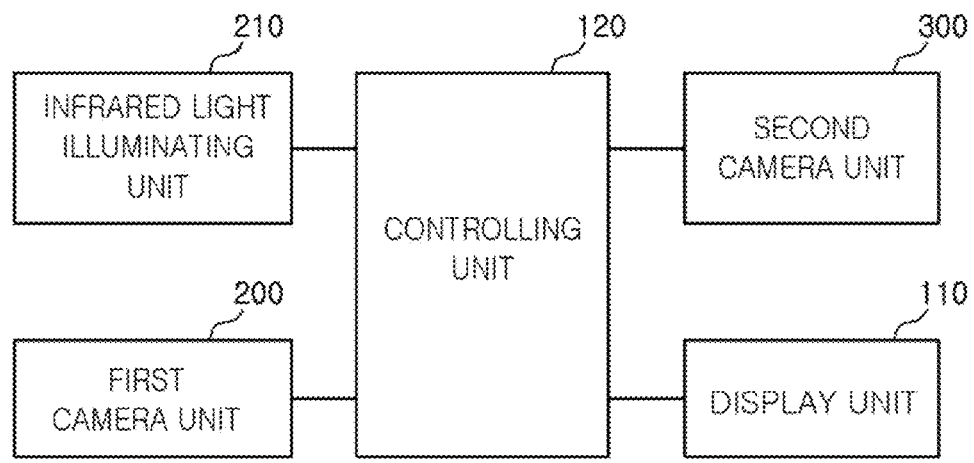
FIG. 2 is a block diagram of a system of controlling an imaging direction and an angle of view of a camera according to an exemplary embodiment of the present disclosure.

FIG. 1 is a flow chart illustrating a method of controlling an imaging direction and an angle of view of a camera according to an exemplary embodiment of the present disclosure; while FIG. 2 is a block diagram of a system of controlling an imaging direction and an angle of view of a camera according to an exemplary embodiment of the present disclosure.

First, referring to FIG. 2, the system of controlling an imaging direction and an angle of view of a camera according to an exemplary embodiment of the present disclosure may include an infrared light illuminating unit 210, a first camera unit 200, a second camera unit 300, a controlling unit 120, and a display unit 110.

The infrared light illuminating unit 210 may irradiate infrared light toward pupils of eyes of a user when the user views a portable electronic apparatus.

Here, a position of infrared light reflected from the pupils of the eyes of the user may be detected by the first camera unit 200, and the controlling unit 120 may track a line of sight of the user from the detected position of reflected infrared light and calculate a viewing angle of the user.

The second camera unit 300 may image an object in an imaging direction and an angle of view that are set depending on the line of sight and the viewing angle of the user, and the display unit 110 may display an image captured by the second camera unit 300.

Next, the method of controlling an imaging direction and an angle of view of a camera according to an exemplary embodiment of the present disclosure will be described with reference to FIG. 1.

Here, a front surface camera disposed on a front surface of the portable electronic apparatus 100 will be referred to as the first camera unit 200, and a rear surface camera disposed on a rear surface of the portable electronic apparatus 100 will be referred to as the second camera unit 300.

First, infrared light may be irradiated toward the pupils 410 of eyes of a user 400 (S10), and the position of infrared light reflected from the pupils 410 of the eyes of the user 400 may be detected by the first camera unit 200.

Since the pupils 410 of the eyes of the user 400 move depending on the line of sight 420 of the eyes of the user 400 viewing the display unit 110 disposed on the front surface of the portable electronic apparatus 100, the position of the infrared light reflected from the pupils 410 of the eyes of the user 400 may be changed depending on the line of sight 420 of the eyes of the user 400.

Therefore, when the eyes of the user 400 view the display unit 110, the line of sight of the eyes of the user 400 may be tracked by the first camera unit 200 (S20).

In addition, the viewing angle of the eyes of the user 400 (viewing angles of the user in a vertical direction and a horizontal direction) maybe calculated by the first camera unit 200 (S30).

Next, a central light point C of the first camera unit 200 and a central light point C' of the second camera unit 300 may be corrected so as to coincide with each other (S40).

Here, in the case in which an optical axis of the first camera unit 200 and an optical axis of the second camera unit 300 coincide with each other, only a displacement depending on a distance between the first and second camera units 200 and 300 in an optical axis direction needs to be corrected, and in the case in which the optical axis of the first camera unit 200 and the optical axis of the second camera unit 300 do not coincide with each other, displacements dx, dy, and dz between the central light point C of the first camera unit 200 and the central light point C' of the second camera unit 300 need to be calculated and corrected.

Next, an imaging direction and an angle of view of the second camera unit 300 may be set based on the line of sight 420 of the eyes of the user 400 and the viewing angle of the eyes of the user 400 (the viewing angles of the user in the vertical direction and the horizontal direction) tracked by the first camera unit 200 (S50).

Next, an image may be captured using the second camera unit 300 (S60), and the captured image may be displayed on the display unit 110 of the portable electronic apparatus 100 (S70).

When the image is captured in a state in which the line of sight 420 and the viewing angle of the eyes of the user 400 are tracked by the first camera unit 200 disposed on the front surface of the portable electronic apparatus 100 and the imaging direction and the view angle of the second camera unit 300 are set based on the line of sight 420 and the viewing angle of the eyes of the user 400, as described above, an image actually viewed by the eyes of the user 400 and the image captured by the second camera unit 300 may coincide with each other.

Therefore, the image actually viewed by the eyes of the user 400 and the image displayed on the display unit 110 may be continuously displayed.

Figure 3:
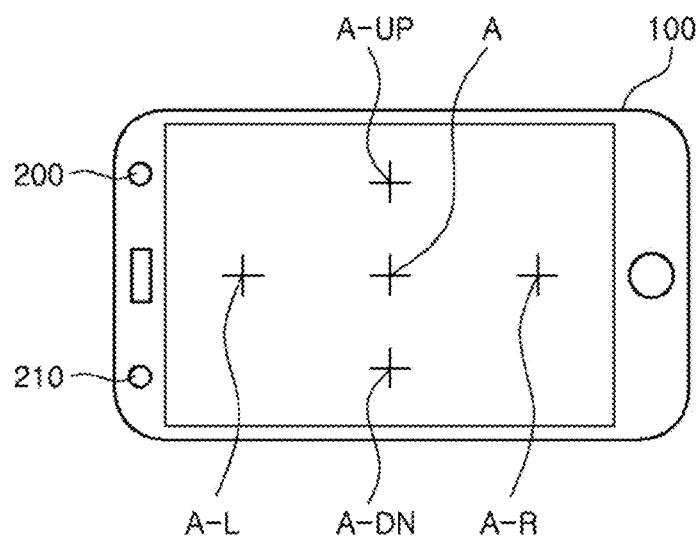
FIG. 3 is conceptual diagram marking points toward which a line of sight of a user is directed on a portable electronic apparatus.

Next, a method in which the first camera unit tracks the line of sight of the user will be described with reference to FIGS. 3 through 4E.

The portable electronic apparatus 100 may include the first camera unit 200, the infrared light illuminating unit 210, and the display unit 110 disposed on the front surface.

When the eyes of the user 400 view the display unit 110, the infrared light illuminating unit 210 may irradiate the infrared light to the pupils 410 of the eyes of the user 400.

Here, the infrared light may be reflected from the pupils 410 of the eyes of the user 400, and the position of reflected infrared light may be detected by the first camera unit 200.

Since the pupils 410 of the eyes of the user 400 move depending on the line of sight 420 of the eyes of the user 400 viewing the display unit 110, the position of the infrared light reflected from the pupils 410 of the eyes of the user 400 may be changed depending on the line of sight 420 of the eyes of the user 400.

Figure 4A:
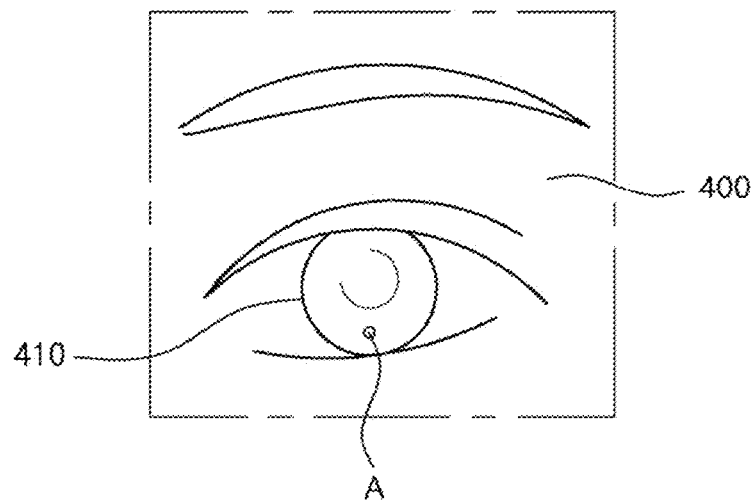
FIGS. 4A through 4E are conceptual diagrams marking a position of reflected infrared light depending on the line of sight of the user.

For example, as illustrated in FIGS. 4A through 4E, when the eyes of the user 400 view a central portion A of the display unit 110, the infrared light may be reflected from a lower portion of the pupils 410 of the eyes of the user 400 (please see FIG. 4A). A position of reflected infrared light in this case will be defined as a reference position A.

Figure 4B:
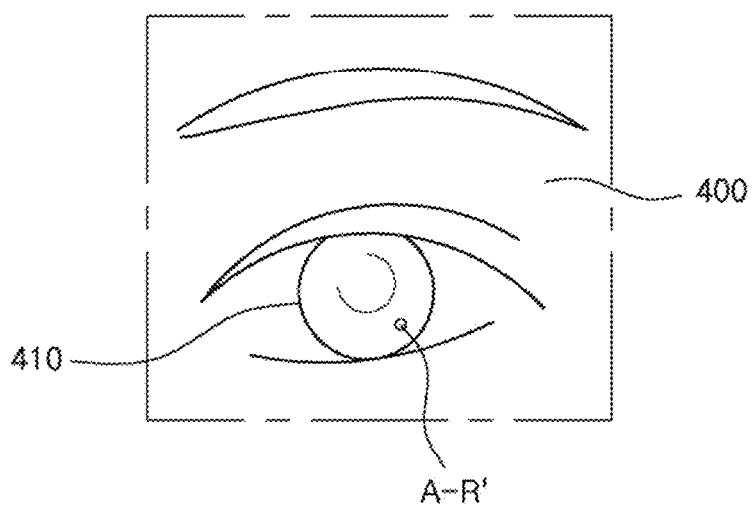

When the eyes of the user 400 view a right portion A-R of the display unit 110, a position of reflected infrared light A-R' of the infrared light may move to the left of the pupils 410 of the eyes of the user 400 based on the reference position A (please see FIG. 4B).

Since a result obtained by reflecting the infrared light from the pupils 410 of the eyes of the user 400 is detected by the first camera unit 200, a direction in which the line of sight 420 of the eyes of the user 400 moves may be opposite to a direction in which the position of infrared light moves, similar to the case in which the infrared light is reflected from a mirror.

Figure 4C:
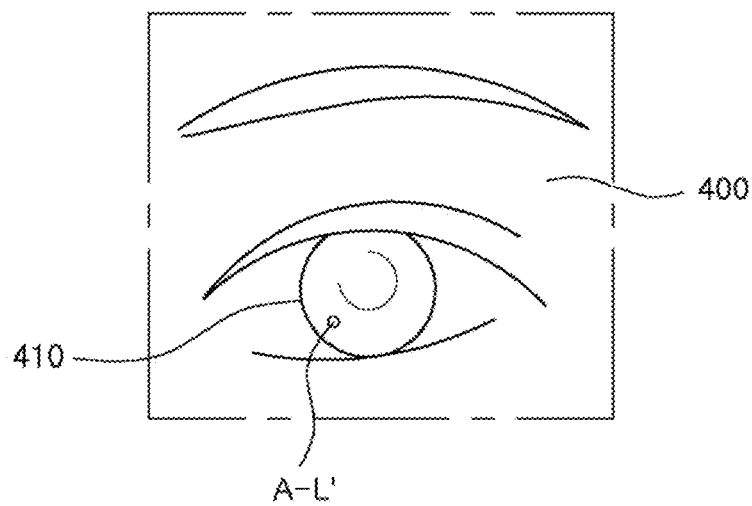

When the eyes of the user 400 view a left portion A-L of the display unit 110, a position of reflected infrared light A-L' of the infrared light may move to the right of the pupils 410 of the eyes of the user 400 based on the reference position A (please see FIG. 4C).

Figure 4D:
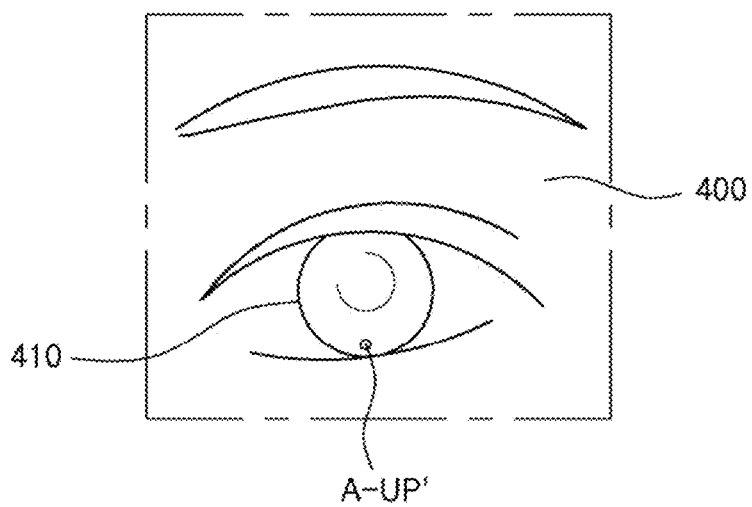

When the eyes of the user 400 view an upper portion A-UP of the display unit 110, a position of reflected infrared light A-UP' of the infrared light may move to a lower portion of the pupils 410 of the eyes of the user 400 based on the reference position A (please see FIG. 4D).

Figure 4E:
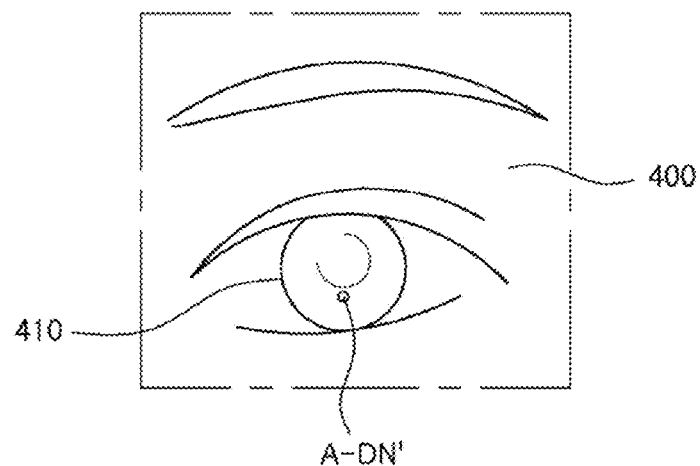

When the eyes of the user 400 view a lower portion A-DN of the display unit 110, a position of reflected infrared light A-DN' of the infrared light may move to an upper portion of the pupils 410 of the eyes of the user 400 based on the reference position A (please see FIG. 4E).

As described above, the controlling unit 120 may track the line of sight 420 of the eyes of the user 400 using the position of infrared light detected by the first camera unit 200.

Next, a method of allowing the line of sight of the user and an imaging direction of a main camera to coincide with each other will be described with reference to FIG. 5.

Figure 5:
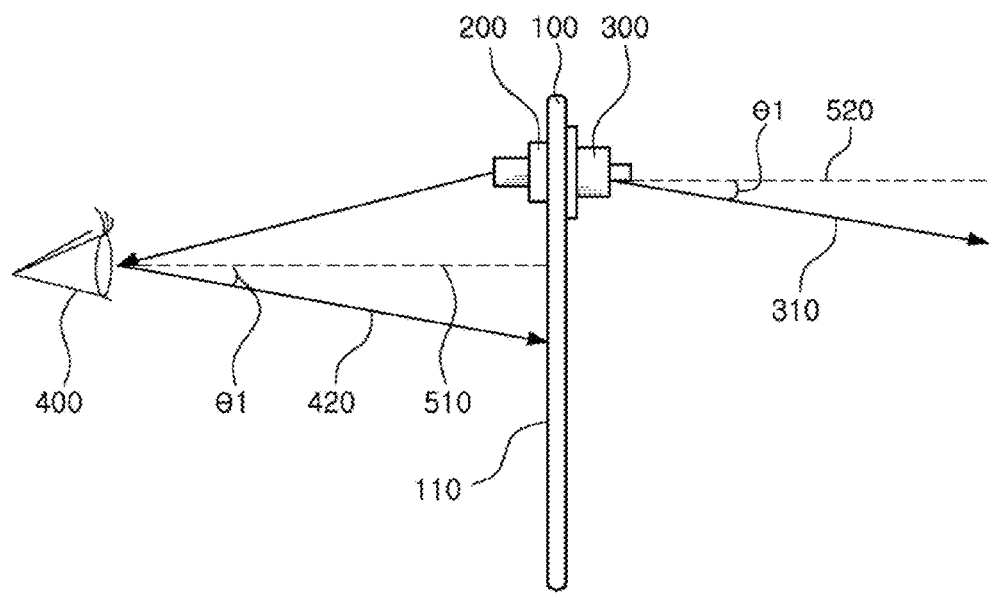
FIG. 5 is a conceptual diagram illustrating a method of allowing the line of sight of the user and an imaging direction of a second camera to coincide with each other.

Referring to FIG. 5, the first camera unit 200 may be disposed on the front surface of the portable electronic apparatus 100, and the second camera unit 300 may be disposed on the rear surface of the portable electronic apparatus 100.

In the case in which the eyes of the user 400 view the display unit 110 from the front, an angle between a first virtual line 510, disposed to be perpendicular with respect to the display unit 110, and the line of sight 420 of the eyes of the user 400 may be 0.

In the case in which the eyes of the user 400 does not view the display unit 110 from the front, a predetermined angle θ1 may be formed between the first virtual line 510 and the line of sight 420 of the eyes of the user 400.

The controlling unit 120 may set the imaging direction 310 of the second camera unit 300 based on the angle θ1.

For example, when the angle θ1 is applied based on a second virtual line 520 that is disposed to be parallel with respect to the first virtual line 510, the imaging direction 310 of the second camera unit 300 may coincide with the line of sight 420 of the eyes of the user 400.

Although only the case in which the line of sight 420 of the eyes of the user 400 is directed toward the lower portion of the display unit 110 has been illustrated in FIG. 5, the imaging direction 310 of the second camera unit 300 may be set as described above, even in the case in which the line of sight 420 of the eyes of the user 400 is directed toward the upper portion, the right portion, or the left portion of the display unit 110.

Meanwhile, the first camera unit 200 and the second camera unit 300 may be mechanically tilted.

Therefore, the first camera unit 200 may be tilted in order to track the line of sight 420 of the eyes of the user 400, and the second camera unit 300 may also be tilted by the angle θ1 calculated depending on the line of sight 420 of the eyes of the user 400 to allow the line of sight 420 of the eyes of the user 400 and the imaging direction 310 of the second camera unit 300 to coincide with each other.

Next, a method of allowing a viewing angle of the eyes of the user 400 and an angle of view of the second camera unit 300 to coincide with each other will be described with reference to FIG. 6.

Figure 6:
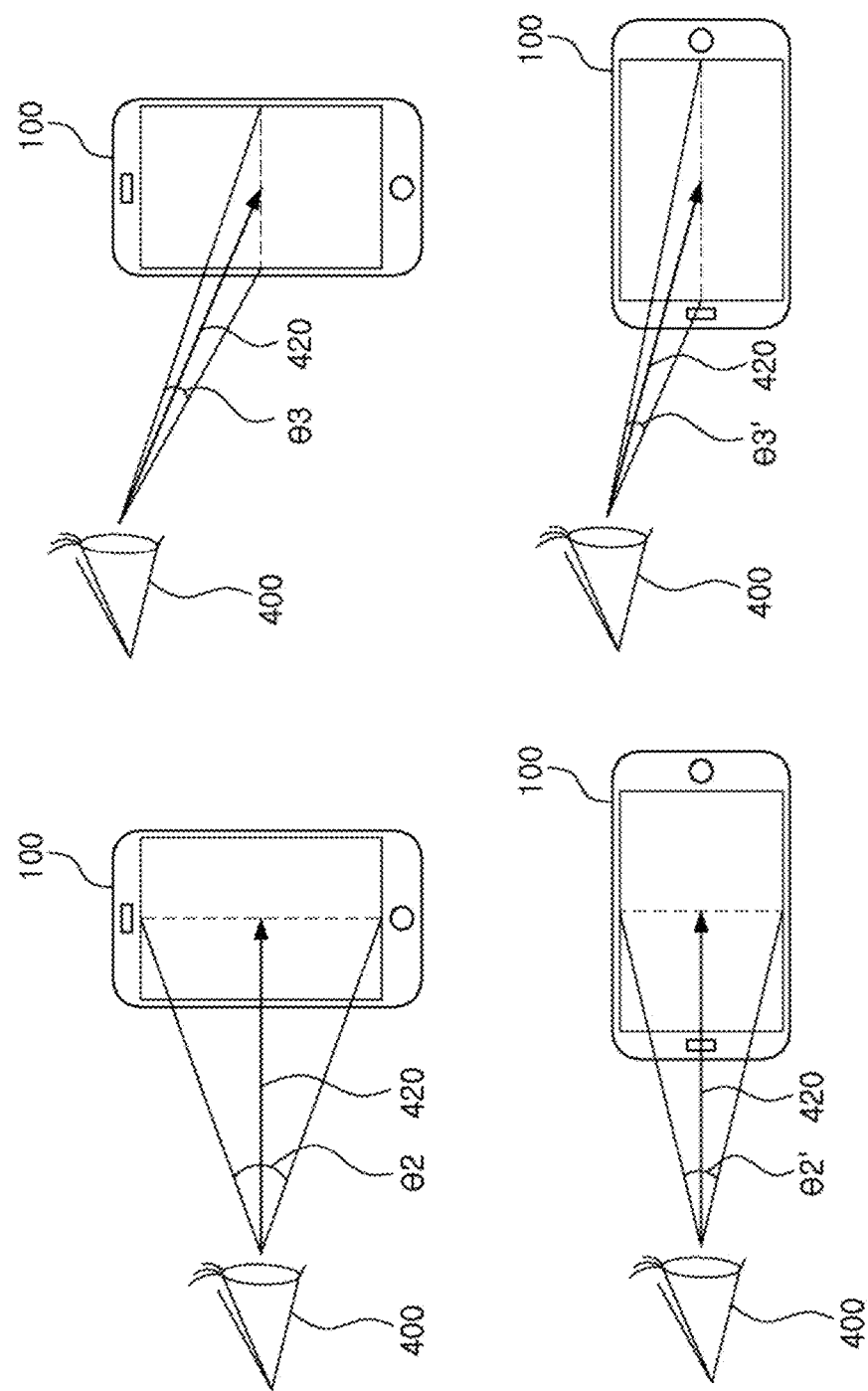
FIG. 6 is a schematic view illustrating a method of allowing a viewing angle of the user and an angle of view of a second camera unit to coincide with each other.

FIG. 6 is a schematic view illustrating a method of allowing a viewing angle of the user and an angle of view of a second camera unit to coincide with each other.

The controlling unit 120 may calculate the viewing angle of the eyes of the user 400 from an angle formed by the line of sight 420 of the eyes of the user 400 and both distal ends of the display unit 110.

For example, an angle formed by both distal ends of the display unit 110 in the vertical direction and the line of sight 420 of the eyes of the user 400 may become a viewing angle θ2 or θ2' of the eyes of the user 400 in the vertical direction, and an angle formed by both distal ends of the display unit 110 in the horizontal direction and the line of sight 420 of the eyes of the user 400 may become a viewing angle θ3 or θ3' of the eyes of the user 400 in the horizontal direction.

The closer to the display unit 110 the eyes of the user 400 are, the wider the viewing angle θ2 or θ2' of the eyes of the user 400 is in the vertical direction and the viewing angle θ3 or θ3' of the eyes of the user 400 in the horizontal direction, and the more distant from the display unit 110 the eyes of the user 400 are, the narrower the viewing angle θ2 or θ2' of the eyes of the user 400 is in the vertical direction and the viewing angle θ3 or θ3' of the eyes of the user 400 in the horizontal direction.

When a pair of measured viewing angles (the viewing angle θ2 or θ2' of the eyes of the user 400 in the vertical direction and the viewing angle θ3 or θ3' of the eyes of the user 400 in the horizontal direction) are applied as the angle of view of the second camera unit 300, the viewing angle of the eyes of the user 400 and the angle of view of the second camera unit 300 may coincide with each other.

Next, a method of allowing the central light point C of the first camera unit 200 and the central light point C' of the second camera unit 300 to coincide with each other will be described with reference to FIGS. 7 and 8.

Figure 7:
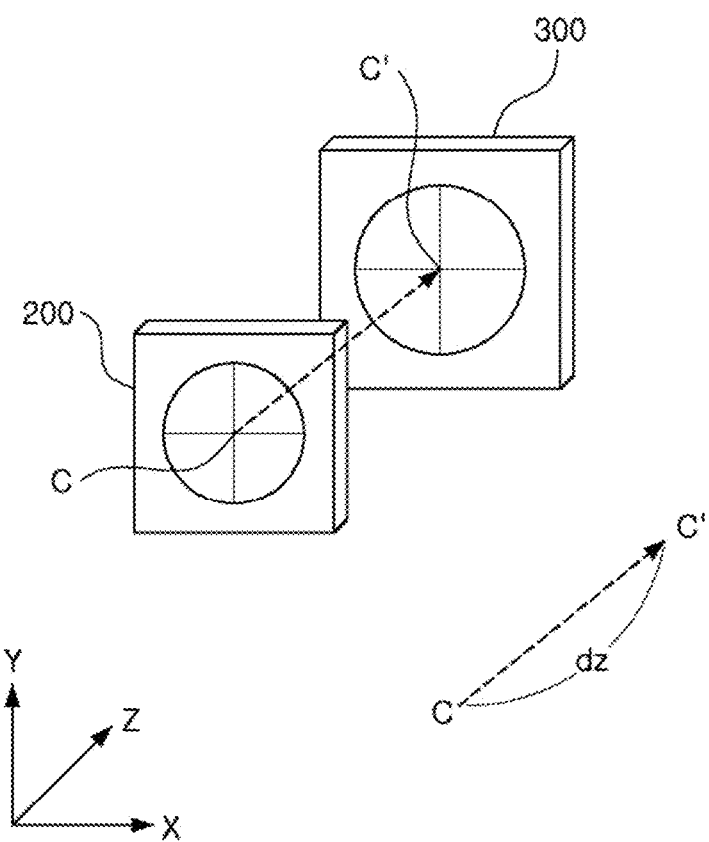
FIG. 7 is a conceptual diagram illustrating a correction method in the case in which an optical axis of a first camera unit and an optical axis of a second camera unit coincide with each other.
Figure 8:
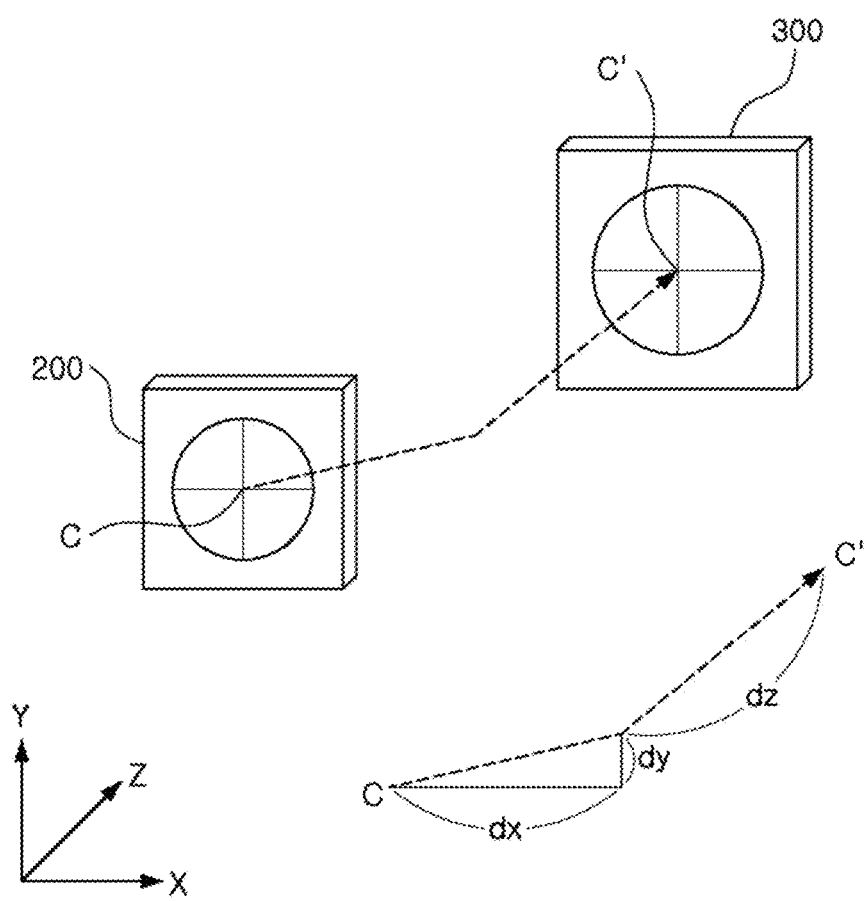
FIG. 8 is a conceptual diagram illustrating a correction method in the case in which the optical axis of the first camera unit and the optical axis of the second camera unit do not coincide with each other.

FIG. 7 is a conceptual diagram illustrating a correction method in the case in which an optical axis of a first camera unit and an optical axis of a second camera unit coincide with each other; and FIG. 8 is a conceptual diagram illustrating a correction method in the case in which the optical axis of the first camera unit and the optical axis of the second camera unit do not coincide with each other.

As illustrated in FIG. 7, in the case in which the optical axis of the first camera unit 200 and the optical axis of the second camera unit 300 coincide with each other, when only a distance dz between the first and second camera units 200 and 300 in the Z direction is corrected, the central light point C of the first camera unit 200 and the central light point C' of the second camera unit 300 may coincide with each other.

As illustrated in FIG. 8, in the case in which the optical axis of the first camera unit 200 and the optical axis of the second camera unit 300 do not coincide with each other, displacements dx, dy, and dz from the central light point C of the first camera unit 200 to the central light point C' of the second camera unit 300 need to be calculated and corrected.

For example, when a displacement dz between the central light point C of the first camera unit 200 and the central light point C' of the second camera unit 300 in the Z direction is finally corrected after displacements dx and dy between the central light point C of the first camera unit 200 and the central light point C' of the second camera unit 300 in the X direction and the Y direction are calculated and corrected, the central light point C of the first camera unit 200 and the central light point C' of the second camera unit 300 may coincide with each other.

In addition, the displacements dx and dy between the central light point C of the first camera unit 200 and the central light point C' of the second camera unit 300 in the X direction and the Y direction may be corrected after the displacement dz between the central light point C of the first camera unit 200 and the central light point C' of the second camera unit 300 in the Z direction is corrected.

Figure 9A:
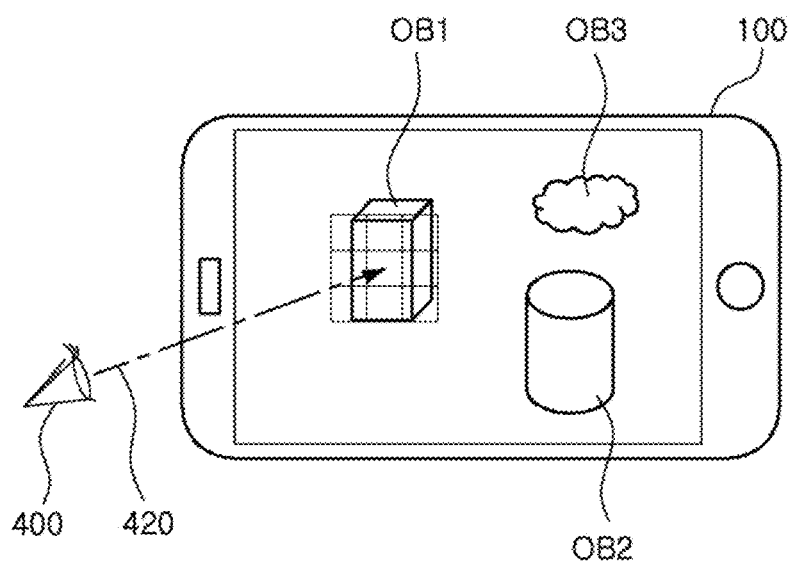
FIGS. 9A through 9C are conceptual diagrams illustrating a process of focusing a camera on an object depending on the line of sight of the user in the system of controlling an imaging direction and an angle of view of a camera according to an exemplary embodiment of the present disclosure.
Figure 9B:
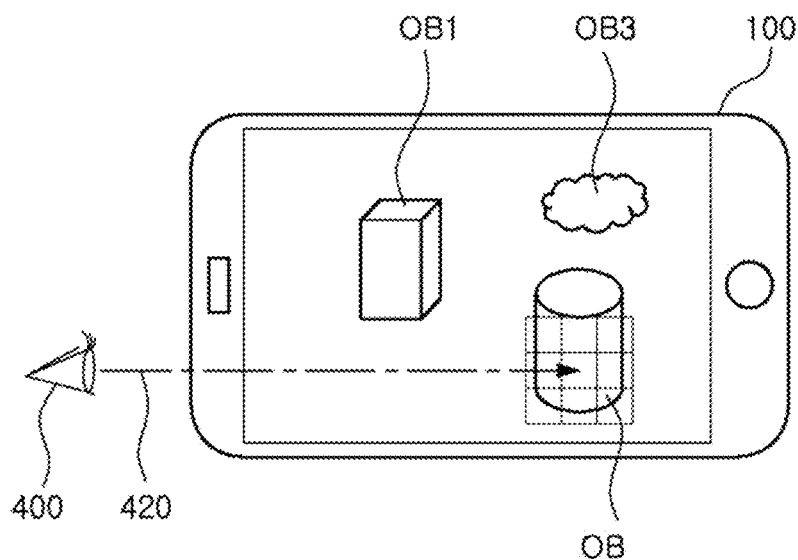
Figure 9C:
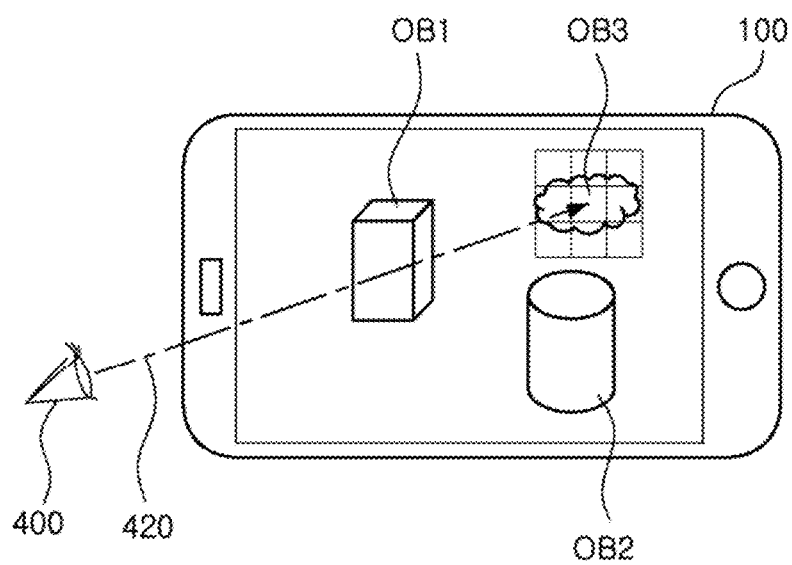

FIGS. 9A through 9C are conceptual diagrams illustrating a process of focusing a camera on an object depending on the line of sight of the user in the system of controlling an imaging direction and an angle of view of a camera according to an exemplary embodiment of the present disclosure.

As illustrated in FIGS. 9A through 9C, in the system of controlling an imaging direction and an angle of view of a camera according to an exemplary embodiment of the present disclosure, the camera may be focused on the object depending on the line of sight 420 of the eyes of the user 400.

For example, in FIG. 9A, the line of sight 420 of the eyes of the user 400 may be directed toward a first object OB1.

As described above, since the first camera unit 200 may track the line of sight 420 of the eyes of the user 400, the second camera unit 300 may be focused on the first object OB1 depending on the line of sight 420 of the eyes of the user 400.

In addition, as illustrated in FIGS. 9B and 9C, in the case in which the line of sight 420 of the eyes of the user 400 is directed toward a second object OB2, the second camera unit 300 may be focused on the second object OB2, and in the case in which the line of sight 420 of the eyes of the user 400 is directed toward a third object OB3, the second camera unit 300 may be focused on the third object OB3.

The system and the method of controlling an imaging direction and an angle of view of a camera according to an exemplary embodiment of the present disclosure may be applied to a smart glasses, a type of wearable computer, and may also be applied to an image capturing device such as a digital camera, a camcorder, or the like.

In the case in which the system and the method of controlling an imaging direction and an angle of view of a camera according to an exemplary embodiment of the present disclosure are applied to the smart glasses, the line of sight and the viewing angle of the user may coincide with the imaging direction and the angle of view of the camera included in the smart glasses. Therefore, a graphic provided as a user interface in the smart glasses may be displayed on an accurate position.

Figure 10:
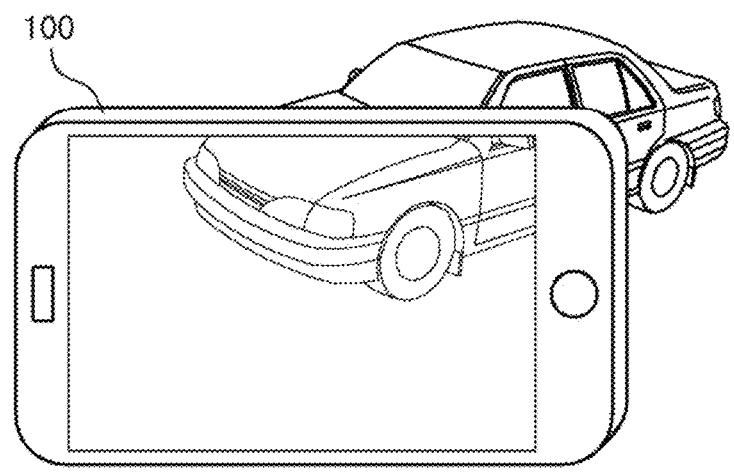
FIG. 10 is a conceptual diagram illustrating a form of the object captured by the system and the method of controlling an imaging direction and an angle of view of a camera according to an exemplary embodiment of the present disclosure.

In addition, also in the case in which the system and the method of controlling an imaging direction and an angle of view of a camera according to an exemplary embodiment of the present disclosure are applied to the image capturing device such as the digital camera, the camcorder, or the like, the slight line and the viewing angle of the user may coincide with the imaging direction and the angle of view of the camera, such that the image actually viewed by the user may be represented on a display unit of the image capturing device as it is in actuality (please see FIG. 10).

As set forth above, with the system and the method of controlling an imaging direction and an angle of view of a camera according to an exemplary embodiment of the present disclosure, since the slight line and the viewing angle of the user may coincide with the imaging direction and the angle of view of the camera, the image captured by the camera and the image actually viewed by the user may coincide with each other.

While exemplary embodiments have been shown and described above, it will be apparent to those skilled in the art that modifications and variations could be made without departing from the scope of the present invention as defined by the appended claims.

What is claimed is:

1. A system of controlling an imaging direction and an angle of view of a camera, comprising:
an infrared light source configured to irradiate infrared light toward pupils of eyes of a user;
a first camera configured to detect a position of infrared light reflected from the pupils of the eyes of the user;
a controller configured to track a line of sight of the user using the position of infrared light changed depending on the line of sight of the user and calculating a viewing angle of the user;
a second camera of which an imaging direction and an angle of view are set depending on the line of sight and the viewing angle of the user set by the controller; and
a display configured to display an image captured by the second camera,
wherein the controller is further configured to allow a central light point of the first camera and a central light point of the second camera to coincide with each other.

2. The system of controlling an imaging direction and an angle of view of a camera of claim 1, wherein the controller is further configured to calculate an angle between a first virtual line perpendicular to the display and the line of sight of the user.

3. The system of controlling an imaging direction and an angle of view of a camera of claim 2, wherein the controller is further configured to calculate an angle between the first virtual line perpendicular to the display and the line of sight of the user in a horizontal direction and an angle between the first virtual line perpendicular to the display and the line of sight of the user in a vertical direction.

4. The system of controlling an imaging direction and an angle of view of a camera of claim 1, wherein the controller is further configured to calculate an angle formed by both distal ends of the display in a vertical direction and the pupils of the eyes of the user as a viewing angle of the user in a vertical direction.

5. The system of controlling an imaging direction and an angle of view of a camera of claim 1, wherein the controller is further configured to calculate an angle formed by both distal ends of the display a horizontal direction and the pupils of the eyes of the user as a viewing angle of the user in a horizontal direction.

6. The system of controlling an imaging direction and an angle of view of a camera of claim 1, wherein in the case in which an optical axis of the first camera and an optical axis of the second camera coincide with each other, the controller is further configured to correct a distance between the central light point of the first camera and the central light point of the second camera in an optical axis direction.

7. The system of controlling an imaging direction and an angle of view of a camera of claim 1, wherein in the case in which an optical axis of the first camera and an optical axis of the second camera do not coincide with each other, the controller is further configured to correct a distance between the central light point of the first camera and the central light point of the second camera in an optical axis direction and a distance between the central light point of the first camera and the central light point of the second camera in a direction perpendicular to the optical axis direction.

8. The system of controlling an imaging direction and an angle of view of a camera of claim 1, wherein the first camera is mounted on one surface of an electronic apparatus, and the second camera is mounted on the other surface of the electronic apparatus.

9. A method of controlling an imaging direction and an angle of view of a camera, comprising:
irradiating infrared light toward pupils of eyes of a user;
detecting, by a first camera, a position of infrared light reflected from the pupils of the eyes of the user;
tracking, by a controller, a line of sight of the user using the position of infrared light;
calculating, by the controller, viewing angles of the user in vertical and horizontal directions;
allowing, by the controller, central light points of the first camera and a second camera to coincide with each other;

setting an imaging direction and an angle of view of the second camera; and photographing an image by the second camera.

10. The method of controlling an imaging direction and an angle of view of a camera of claim 9, wherein in the tracking of the line of sight of the user, the line of sight of the user is tracked using the position of infrared light changed depending on the line of sight of the user.

11. The method of controlling an imaging direction and an angle of view of a camera of claim 9, wherein in the calculating of the viewing angles of the user in vertical and horizontal directions, an angle formed by both distal ends of a display in the vertical direction and the pupils of the eyes of the user is calculated as the viewing angle of the user in the vertical direction, and an angle formed by both distal ends of the display in the horizontal direction and the pupils of the eyes of the user is calculated as the viewing angle of the user in the horizontal direction.

12. The method of controlling an imaging direction and an angle of view of a camera of claim 9, wherein in the setting of the imaging direction and the angle of view of the second camera, an angle between a first virtual line perpendicular to a display unit and the line of sight of the user is calculated.

* * * * *